United States Patent
Lin et al.

(10) Patent No.: US 11,665,057 B2
(45) Date of Patent: *May 30, 2023

(54) METHOD FOR REDUCING POWER CONSUMPTION AND DEVICE

(71) Applicant: Honor Device Co., Ltd., Shenzhen (CN)

(72) Inventors: Dawei Lin, Shenzhen (CN); Lei Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,831

(22) Filed: Apr. 11, 2022

(65) Prior Publication Data

US 2022/0239558 A1 Jul. 28, 2022

Related U.S. Application Data

(63) Continuation of application No. 16/770,745, filed as application No. PCT/CN2018/081087 on Mar. 29, 2018, now Pat. No. 11,405,271.

(30) Foreign Application Priority Data

Dec. 6, 2017 (CN) .......................... 201711279562.4

(51) Int. Cl.
 *H04L 41/0816* (2022.01)
 *H04L 69/16* (2022.01)

(52) U.S. Cl.
 CPC .......... *H04L 41/0816* (2013.01); *H04L 69/16* (2013.01)

(58) Field of Classification Search
 CPC ..... H04L 41/0816; H04L 69/16; H04L 69/12; H04L 69/22; H04L 67/143; H04L 69/163;
 (Continued)

(56) References Cited

U.S. PATENT DOCUMENTS 9,325,728 B1 4/2016 Kennedy et al.
9,681,378 B2 * 6/2017 Liu ........................ G06F 1/3278
(Continued)

FOREIGN PATENT DOCUMENTS

CN 101860983 A 10/2010
CN 105045519 A 11/2015
(Continued)

OTHER PUBLICATIONS

Ravenscraft, E., "Squeeze More Battery Put of Your Phone With Android Doze Apps," retrieved from the internet: https://lifehacker.com/how-to-squeeze-more-battery-put-pf-your-phone-with-andr-1791336715, Jan. 18, 2017, 10 pages.

(Continued)

*Primary Examiner* — Schquita D Goodwin
(74) *Attorney, Agent, or Firm* — Conley Rose, P.C.

(57) ABSTRACT

Embodiments of this application disclose a method for reducing power consumption and a device, and relate to the field of mobile terminals, to further reduce power consumption of a terminal device when the terminal device enters a doze mode. A specific solution is as follows: After detecting that screen-off duration of the terminal device is greater than first duration, the terminal device sends a transmission control protocol reset packet to an application server of a to-be-controlled application, so that the application server disconnects a TCP connection to the terminal device. Therefore, after the terminal device enters the doze mode, the power consumption of the terminal device is further reduced. The embodiments of this application are used to reduce power consumption of the terminal device.

20 Claims, 9 Drawing Sheets

(58) Field of Classification Search
CPC ........ Y02D 10/00; Y02D 30/00; Y02D 30/70; G06F 1/3206; G06F 1/3262; G06F 1/3218; G06F 1/32; H04W 52/0251; H04W 52/0261
See application file for complete search history.

(56) References Cited

U.S. PATENT DOCUMENTS

| | | | |
|---|---|---|---|
| 9,699,729 B2 * | 7/2017 | Lebon-Schneider | H04W 52/0258 |
| 9,974,017 B1 | 5/2018 | Lin et al. | |
| 10,070,370 B1 * | 9/2018 | Gummuluri | H04W 52/028 |
| 10,097,477 B2 | 10/2018 | Yoon et al. | |
| 11,405,271 B2 * | 8/2022 | Lin | G06F 1/3206 |
| 2011/0154323 A1 | 6/2011 | Arndt et al. | |
| 2011/0202972 A1 | 8/2011 | Jiang | |
| 2013/0329632 A1 | 12/2013 | Buyukkoc et al. | |
| 2014/0331280 A1 | 11/2014 | Porras et al. | |
| 2015/0023160 A1 * | 1/2015 | Alisawi | H04W 28/0221 370/230 |
| 2015/0077787 A1 * | 3/2015 | Nishimura | G06F 3/1239 358/1.14 |
| 2015/0106637 A1 | 4/2015 | Zhang et al. | |
| 2015/0282086 A1 | 10/2015 | Gupta | |
| 2015/0346933 A1 | 12/2015 | Vyas et al. | |
| 2016/0234316 A1 | 8/2016 | Liao et al. | |
| 2017/0099636 A1 | 4/2017 | Arunachalam et al. | |
| 2017/0118611 A1 | 4/2017 | Schieman et al. | |
| 2017/0284129 A1 * | 10/2017 | King | A61G 7/1003 |
| 2018/0041349 A1 * | 2/2018 | Jung | H04N 21/4436 |
| 2018/0095518 A1 | 4/2018 | Guo et al. | |
| 2019/0028368 A1 | 1/2019 | Modi et al. | |
| 2019/0069234 A1 * | 2/2019 | Neelakandan | H04W 52/0216 |
| 2019/0098074 A1 * | 3/2019 | He | G16H 30/20 |
| 2020/0334071 A1 * | 10/2020 | Guo | G06F 9/5005 |
| 2021/0119869 A1 | 4/2021 | Lin et al. | |

FOREIGN PATENT DOCUMENTS

| | | |
|---|---|---|
| CN | 105676994 A | 6/2016 |
| CN | 105873097 A | 8/2016 |
| CN | 106250163 A | 12/2016 |
| CN | 106502371 A | 3/2017 |
| CN | 106547335 A | 3/2017 |
| CN | 106774786 A | 5/2017 |
| CN | 107329558 A | 11/2017 |
| CN | 106031222 A | 1/2020 |
| CN | 106471794 A | 1/2020 |
| EP | 3244310 A1 | 11/2017 |
| EP | 3276928 A1 | 1/2018 |
| WO | 2016165062 A1 | 10/2016 |
| WO | WO-2018055506 A1 * | 3/2018 ............. G06F 9/445 |

OTHER PUBLICATIONS

Chen, T., et al., "Silent Battery Draining Attack Against Android Systems by Subverting Doze Mode," retrieved from the Internet: https://ieeexplore.ieee.org/stamp/stamp.jsp?tp=&arnumber=7842268, Feb. 6, 2017, 6 pages.

* cited by examiner

METHOD FOR REDUCING POWER CONSUMPTION AND DEVICE

CROSS-REFERENCE TO RELATED APPLICATIONS

This application is a continuation of U.S. patent application Ser. No. 16/770,745, filed on Jun. 8, 2020, which is a national stage of International Application No. PCT/CN2018/081087, filed on Mar. 29, 2018, which claims priority to Chinese Patent Application No. 201711279562.4, filed on Dec. 6, 2017. All the aforementioned applications are hereby incorporated by reference in their entireties.

TECHNICAL FIELD

Embodiments of this application relate to the field of mobile terminals, and in particular, to a method for reducing power consumption and a device.

BACKGROUND

Currently, the Android (Android) system 6.0 version and later versions provide a doze (Doze) mode for reducing power consumption and extending a battery life. When a terminal device is not connected to a power supply, and a user does not operate the terminal device, the terminal device enters a doze mode after being in a screen-off state for a period of time. In the doze mode, a data packet is intercepted by using a firewall mechanism, and an application (application, APP) is controlled by using a whitelist. To be specific, an application processor (application processor, AP) and a network activity of the application in the background are delayed, so that an external packet does not interact with an upper-layer application, and activities of the application are reduced, thereby reducing power consumption of the terminal device.

However, before entering the doze mode, the terminal device receives a transmission control protocol (transmission control protocol, TCP) packet sent by an application server, and when the application server waits for a TCP acknowledgment (ACK) packet fed back by the terminal device, the terminal device enters the doze mode and controls an application. In this case, the terminal device cannot send the TCP acknowledgment packet to the application server. If the application server does not receive, within a preset time period, the TCP acknowledgment packet fed back by the terminal device, the application server constantly sends TCP retransmission (retransmission) packets to the terminal device. Consequently, a modem (modem) and the application processor of the terminal device are frequently woken up, which may even last for 30 seconds to 50 seconds. In this way, power consumption of the terminal device is increased. Therefore, how to reduce power consumption of the terminal device when the terminal device enters the doze mode is a problem that needs to be urgently resolved.

SUMMARY

Embodiments of this application provide a method for reducing power consumption and a device, to reduce power consumption of a terminal device when the terminal device enters a doze mode.

To achieve the foregoing objective, the following technical solutions are used in the embodiments of this application.

A first aspect of the embodiments of this application provides a method for reducing power consumption, applied to a terminal device or a chip built in the terminal device, where the terminal device is not connected to a power supply. The method includes: detecting that screen-off duration of the terminal device is greater than first duration, sending a transmission control protocol reset (reset) packet to an application server of a to-be-controlled application, where the transmission control protocol reset packet is used to instruct the application server to disconnect a TCP connection to the terminal device, and the first duration is less than duration from a moment at which the terminal device is screen-off to a moment at which the terminal device enters an idle state of a doze mode. According to the method for reducing power consumption provided in the embodiments of this application, after determining that the screen is off for a period of time, the terminal device actively sends the TCP reset packet to the application server, so that the application server disconnects the TCP connection to the terminal device. In this way, after the terminal device enters the doze mode, a quantity of times that the terminal device is woken up because the application server constantly sends TCP retransmission packets to the terminal device is reduced, thereby reducing power consumption of the terminal device.

With reference to the first aspect, in a possible implementation, after the detecting that screen-off duration of the terminal device is greater than first duration, the method further includes: determining the to-be-controlled application based on a to-be-controlled application list, where the to-be-controlled application list includes at least one to-be-controlled application.

With reference to the first aspect, in another possible implementation, after the detecting that screen-off duration of the terminal device is greater than first duration, the method further includes: determining an application type of the to-be-controlled application. The application type may be divided based on a user's use habit, or may be analyzed based on attributes such as a program component and a capability of an application, and a user behavior, to determine an application to which the to-be-controlled application belongs. For example, an instant messaging application (WeChat or QQ) includes a voice component, a photographing component, and the like. A traveling application (DiDi or Uber) includes a map component and the like.

With reference to the possible implementations, in another possible implementation, the sending a transmission control protocol reset packet to an application server of a to-be-controlled application includes: sending, based on the application type of the to-be-controlled application, the transmission control protocol reset packet to the application server of the to-be-controlled application.

With reference to the possible implementations, in another possible implementation, before the sending, based on the application type of the to-be-controlled application, the transmission control protocol reset packet to the application server of the to-be-controlled application, the method further includes: detecting that the screen-off duration of the terminal device is greater than or equal to second duration and the terminal device does not move, where the second duration is greater than the first duration, and the second duration is equal to the duration from the moment at which the terminal device is screen-off to the moment at which the terminal device enters the idle state of the doze mode.

Therefore, the terminal device determines the to-be-controlled application based on the to-be-controlled application list, classifies the to-be-controlled application based on the application type of the to-be-controlled application, and then sends, based on the application type of the to-be-controlled application, the TCP reset packet to the application server of the to-be-controlled application, to implement refined control over the to-be-controlled application, thereby reducing power consumption.

With reference to the possible implementations, in another possible implementation, after the sending a transmission control protocol reset packet to an application server of a to-be-controlled application, the method further includes: receiving a transmission control protocol retransmission packet sent by the application server of the to-be-controlled application, where the transmission control protocol retransmission packet is used to instruct the terminal device to retransmit a transmission control protocol acknowledgment packet to the application server of the to-be-controlled application; and sending the transmission control protocol reset packet to the application server of the to-be-controlled application.

A second aspect of the embodiments of this application provides a terminal device, where the terminal device is not connected to a power supply. The terminal device includes: a processing unit, configured to detect that screen-off duration of the terminal device is longer than first duration, where the first duration is less than duration from a moment at which the terminal device is screen-off to a moment at which the terminal device enters an idle state of a doze state; a sending unit, configured to send a transmission control protocol TCP reset packet to an application server of a to-be-controlled application, where the transmission control protocol reset packet is used to instruct the application server to disconnect a TCP connection to the terminal device.

It should be noted that, the function modules in the second aspect may be implemented by hardware, or may be implemented by hardware by executing corresponding software. The hardware or software includes one or more modules corresponding to the foregoing functions. For example, a transceiver is configured to complete functions of a receiving unit and the sending unit, a processor is configured to complete functions of the processing unit, and a memory is configured to store a program instruction of the method for reducing power consumption that is in the embodiments of this application and that is processed by the processor. The processor, the transceiver, and the memory are connected and communicate with each other by using a bus. Specifically, refer to a function of a behavior of the terminal device in the method for reducing power consumption provided in the first aspect.

A third aspect of the embodiments of this application provides a terminal device, including a processor, a memory, a bus, and a communications interface. The memory is configured to store a computer executable instruction. The processor and the memory are connected by using the bus. When the processor runs, the processor executes the computer executable instruction stored in the memory, so that the terminal device performs the method according to any one of the foregoing aspects.

A fourth aspect of the embodiments of this application provides a computer-readable storage medium, including: a computer software instruction; when the computer software instruction is run on a terminal device or a chip built in the terminal device, the terminal device is enabled to perform the method for reducing power consumption.

A fifth aspect of the embodiments of this application provides a computer program product including an instruction, where when the computer program product is run on a terminal device or a chip built in the terminal device, the terminal device is enabled to perform the method for reducing power consumption.

In addition, for technical effects brought by the design manners of any one of the foregoing aspects, refer to technical effects brought by different design manners of the first aspect. Details are not described herein again.

In the embodiments of this application, a name of the terminal device constitutes no limitation on the device. In an actual implementation, the devices may have other names. Provided that functions of each device are similar to those in the embodiments of this application and fall within the scope of the claims of this application and their equivalent technologies.

DESCRIPTION OF EMBODIMENTS

To reduce power consumption of a terminal device when the terminal device enters a doze mode, the embodiments of this application provide a method for reducing power consumption. A basic principle of the method is as follows: When the terminal device is not connected to a power supply, the terminal device detects that screen-off duration of the terminal device is greater than first duration, and sends a TCP reset packet to an application server of a to-be-controlled application. The TCP reset packet is used to instruct the application server to disconnect a TCP connection to the terminal device. The first duration is less than duration for which the terminal device enters an idle state of the doze mode. According to the method for reducing power consumption provided in the embodiments of this application, after determining that a screen is off for a period of time, the terminal device actively sends the TCP reset packet to the application server, so that the application server disconnects the TCP connection to the terminal device. In this way, after the terminal device enters the doze mode, a quantity of times that the terminal device is woken up because the application server constantly sends TCP retransmission packets to the terminal device is reduced, thereby reducing power consumption of the terminal device.

The following describes the implementations of the embodiments of this application in detail with reference to accompanying drawings.

Figure 1:
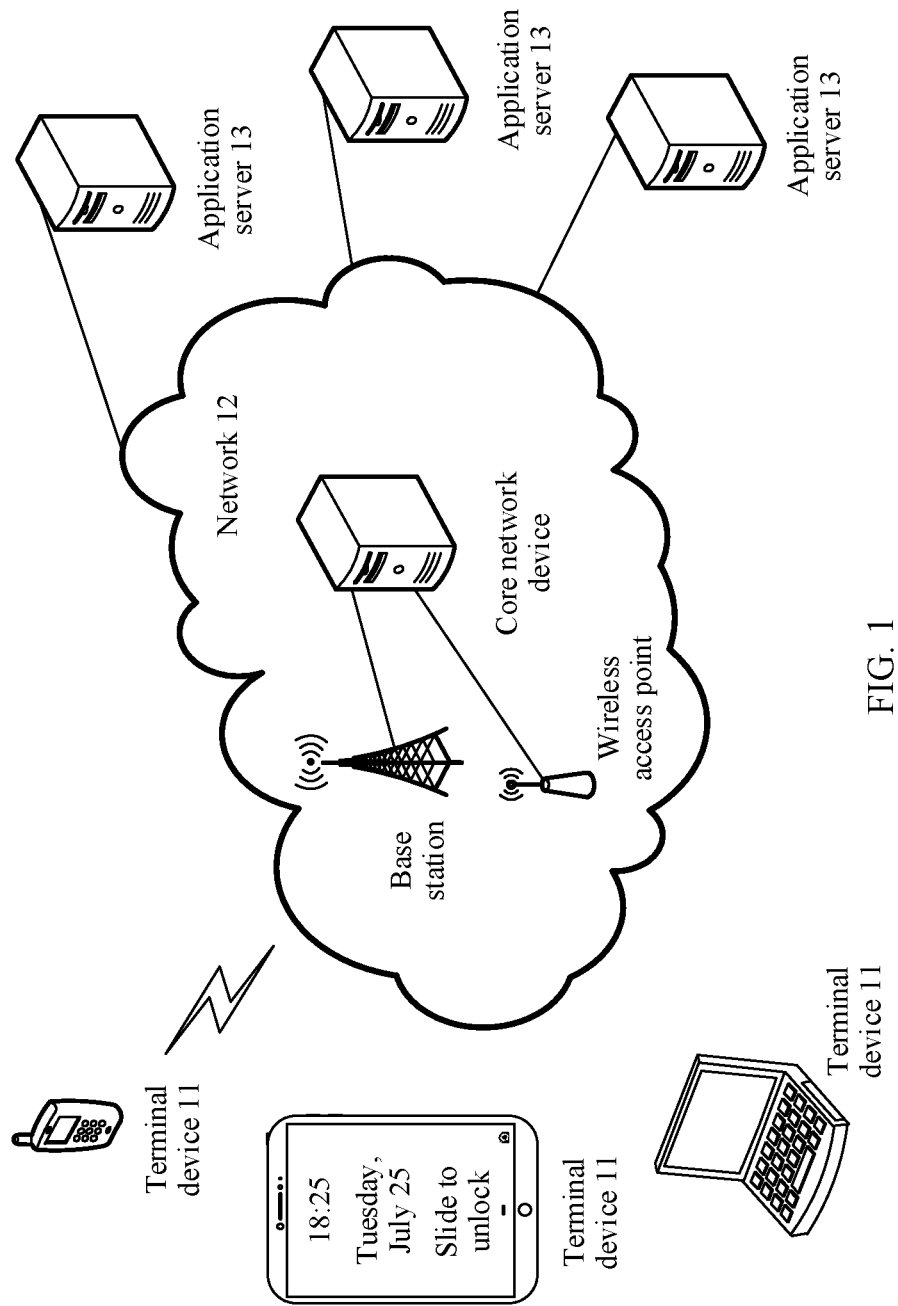
FIG. 1 is a simplified schematic diagram of a communications system according to an embodiment of this application.

FIG. 1 is a simplified schematic diagram of a communications system to which an embodiment of this application may be applied. As shown in FIG. 1, the communications system may include a terminal device 11, a network 12, and an application server 13. The application server 13 is connected to the network 12 in a wired manner, and the terminal device 11 communicates with the application server 13 through the network 12.

The terminal device 11 may be a wireless terminal. The wireless terminal may be a device that provides a user with voice and/or data connectivity, a handheld device with a wireless connection function, or another processing device connected to a wireless modem. The wireless terminal may communicate with one or more core networks or Internet through a radio access network (for example, radio access network, RAN). The wireless terminal may be a mobile terminal, such as a mobile phone (or referred to as a "cellular" phone), a computer, or a data card, for example, may be a portable, pocket-sized, handheld, computer built-in, or vehicle-mounted mobile apparatus that exchanges a language and/or data with the radio access network. For example, the wireless terminal may be a device such as a personal communication service (personal communication service, PCS) phone, a cordless phone, a session initiation protocol (SIP) phone, a wireless local loop (wireless local loop, WLL) station, and a personal digital assistant (personal digital assistant, PDA). The wireless terminal may also be referred to as a system, a subscriber unit (subscriber unit), a subscriber station (subscriber station), a mobile station (mobile station), a mobile console (mobile), a remote station (remote station), an access point (access point), a remote terminal (remote terminal), an access terminal (access terminal), a user terminal (user terminal), a user agent (user agent), a subscriber station (subscriber station, SS), a customer-premises equipment (customer premises equipment, CPE), user equipment (user equipment, UE), or the like. The terminal device 11 may perform wireless communication with a device in the network 12 by using a 3rd generation mobile communication (the third generation telecommunication, 3G) technology, a long term evolution (long term evolution, LTE) technology, a 5th generation mobile communication (the fifth generation telecommunication, 5G) technology, or the like. Certainly, the terminal device 11 may also connect to a network in a wired manner, and may communicate with the application server 13. In an embodiment, the terminal device shown in FIG. 1 may be a mobile phone.

Figure 2:
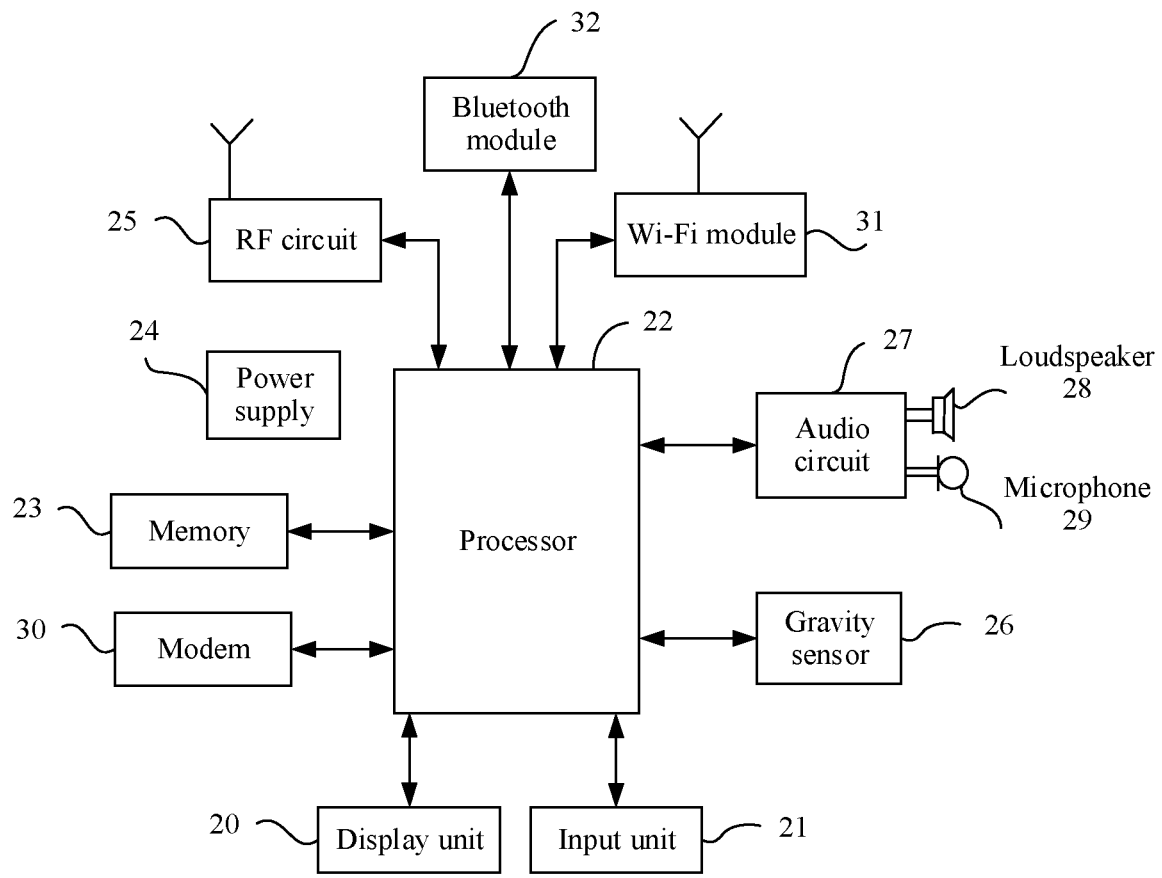
FIG. 2 is a schematic composition diagram of a mobile phone according to an embodiment of this application.

FIG. 2 is a schematic composition diagram of a mobile phone according to an embodiment of this application. As shown in FIG. 2, the mobile phone may include components such as a display unit 20, an input unit 21, a processor 22, a memory 23, a power supply 24, a radio frequency (radio frequency, RF) circuit 25, a gravity sensor 26, an audio circuit 27, a loudspeaker 28, a microphone 29, a modem 30, a Wi-Fi module 31, and a Bluetooth module 32. These components may be connected by using a bus, or may be directly connected. A person skilled in the art may understand that a structure of the mobile phone shown in FIG. 2 constitutes no limitation on the mobile phone, and the mobile phone may include more components than those shown in the figure, or combine some components, or have different component deployments.

The display unit 20 is operably connected to the processor 22, and is configured to receive and display a processing result returned by the processor 22. For example, the display unit 20 may be configured to display an image captured by using a camera, and various menus of the mobile phone. A graphical user interface (graphical user interface, GUI) is usually configured on the display unit 20, and the GUI is configured to provide an easy-to-use interface between a user and an operating system running on the mobile phone.

The input unit 21 may be a single-point or multipoint input unit. The input unit 21 is operably connected to the processor 22, and is configured to receive an input operation of the user. The input unit 21 may be a touchpad or a touchscreen that is disposed above or in front of the display unit 20. The touchpad or the touchscreen may collect a touch operation performed on or near the touchpad or the touchscreen by the user (for example, an operation performed on the touchscreen or near the touchscreen by the user through any proper object or accessory such as a finger or a stylus), and drive a corresponding connection apparatus based on a preset program. For example, the touchpad or the touchscreen may be implemented based on a sensing technology such as capacitance sensing, resistance sensing, surface acoustic wave sensing, pressure sensing, or light sensing. The touchpad or the touchscreen may be integrated with the display unit 20, or may be an independent component.

As a control center of the mobile phone, the processor 22 connects various parts of the entire mobile phone by using various interfaces and lines, and performs various functions of the mobile phone and processes data by running or executing a software program and/or a module stored in the memory 23 and by invoking data stored in the memory 23, to perform overall monitoring on the mobile phone. In a specific implementation, in an embodiment, the processor 22 may include one or more processing units. An application processor and a modem processor may be integrated into the processor 22. The application processor mainly processes an operating system, a user interface, an application, and the like. The modem processor mainly processes wireless communication. It can be understood that the modem processor may not be integrated into the processor 22. In the embodiments of this application, the processor 22 is configured to detect that screen-off duration of the terminal device is greater than first duration, obtain a to-be-controlled application, and control the to-be-controlled application, so that the terminal device enters a doze mode.

The memory 23 may be configured to store data, a software program, and a module, and may be a volatile memory (volatile memory), for example, a random access memory (random-access memory, RAM); or a non-volatile memory (non-volatile memory), for example, a read-only memory (read-only memory, ROM), a flash memory (flash memory), a hard disk (hard disk drive, HDD), or a solid-state drive (solid-state drive, SSD); or a combination of the foregoing types of memories; or may be a removable storage medium, for example, a secure digital (secure digital, SD) memory card. Specifically, the memory 23 may store program code, and the program code is used to enable the processor 22 to perform, by executing the program code, the method for reducing power consumption provided in the embodiments of this application.

The power supply 24 may be a battery, and is logically connected to the processor 22 by using a power supply management system, to implement functions such as charging management, discharging management, and power consumption management by using the power supply management system.

The RF circuit 25 may be configured to receive and send information, or receive and send a signal during a call. Particularly, the RF circuit 25 sends received information to the processor 22 for processing, and sends a signal generated by the processor 22. Generally, an RF circuit includes but is not limited to an antenna, at least one amplifier, a transceiver, a coupler, a low noise amplifier (low noise amplifier, LNA), a duplexer, and the like. In addition, the RF circuit 25 may also communicate with a network and another device through wireless communication. In the embodiments of this application, the RF circuit 25 may communicate with an application server to transmit a TCP reset packet.

The gravity sensor (gravity sensor) 26 may detect a value of acceleration in each direction (generally, three axes) of the mobile phone, may detect a value and a direction of gravity in a static mode, and may be used for an application that identifies a mobile phone gesture (such as landscape-to-portrait switching, related games, and magnetometer gesture calibration), a function related to vibration identification (such as a pedometer and a strike), and the like. It should be noted that, the mobile phone may further include other sensors such as a pressure sensor, an optical sensor, a gyroscope, a barometer, a hygrometer, a thermometer, and an infrared sensor. Details are not described herein.

The audio circuit 27, the loudspeaker 28, and the microphone 29 may provide an audio interface between the user and the mobile phone. The audio circuit 27 may transmit an electrical signal converted from received audio data to the loudspeaker 28, and the loudspeaker 28 converts the electrical signal into a sound signal for outputting. In addition, the microphone 29 converts a collected sound signal into an electrical signal, and the audio circuit 27 converts the electrical signal into audio data after receiving the electrical signal, and then outputs the audio data to the RF circuit 25 to send the audio data to, for example, another mobile phone, or outputs the audio data to the processor 22 for further processing.

The Wi-Fi module 31 may be a module including a Wi-Fi chip and a Wi-Fi chip driver, and the Wi-Fi chip is capable of running a wireless Internet standard protocol. The Bluetooth module 32 is a printed circuit board assembly (Printed Circuit Board Assembly, PCBA) integrating with a Bluetooth function, and is configured for short-range wireless communication. In addition, an operating system runs above the foregoing components. An application such as WeChat, QQ, or Weibo may be installed and run in the operating system. In addition, although not shown, the mobile phone may further include a component such as a camera.

The network 12 may include network devices such as a base station, a wireless access point, and a core network device. The base station may be a base station (base station, BS), a base station controller, or the like in wireless communication. Alternatively, the base station may be referred to as a transceiver station, a relay station, a transmission reception point (transmit and receive port, TRP), or the like. Specifically, the base station is an apparatus that is deployed in the radio access network and that is configured to provide a wireless communication function for the terminal device 11. Main functions of the base station include one or more of the following functions: radio resource management, internet protocol (internet protocol, IP) header compression, user data stream encryption, mobility management entity (mobility management entity, MME) selection during attachment of user equipment, routing of user plane data to a serving gateway (service gateway, SGW), paging message organization and sending, broadcast message organization and sending, and measurement and measurement report configuration for a purpose of mobility or scheduling, and the like. The base station may include various forms of cellular base stations, home eNodeBs, cells, wireless transmission points, macro base stations, micro base stations, relay stations, wireless access points, and the like. In a system using different radio access technologies, names of devices having a function of a network device may be different. For example, in a 3G system, the device is referred to as a NodeB (NodeB); in an LTE system, the device is referred to as an evolved NodeB (evolved NodeB, eNB or eNodeB); in a 5G system, the device is referred to as a gNB or the like; and in a wireless local access system, the device is referred to as an access point (access point). With evolution of communications technologies, a name of the base station may change. In addition, in another possible case, the base station may be another apparatus that provides a wireless communication function for the terminal device 11. For ease of description, in the embodiments of the present invention, the apparatus that provides a wireless communication function for the terminal device 11 is referred to as the base station. In the embodiments of this application, after receiving the TCP reset packet sent by the terminal device 11, the base station transmits the TCP reset packet to the application server by using a core network device, and network devices such as a switch and a router.

The application server 13 provides a path of accessing business logic for using by a client application. In other words, the application server 13 may be a device that serves an application installed on the terminal device 11, for example, a WeChat server, a QQ server, or a Sina Weibo server.

In addition, in the embodiments of this application, the word "for example", "such as", or the like, is used to represent giving an example, an illustration, or a description. Any embodiment or design scheme described as "for example" or "such as" in the embodiments of this application should not be interpreted as being preferable or having more advantages than another embodiment or design scheme. Exactly, use of the word "for example", "such as", or the like is intended to present a concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

It should be noted that the "connection" described above means that mutual communication may be performed, and specifically, the connection may be a wired connection or may be a wireless connection. This is not specifically limited in the embodiments of this application. Devices connected to each other may be directly connected, or may be connected by using another device. This is not specifically limited in the embodiments of this application.

Figure 3:
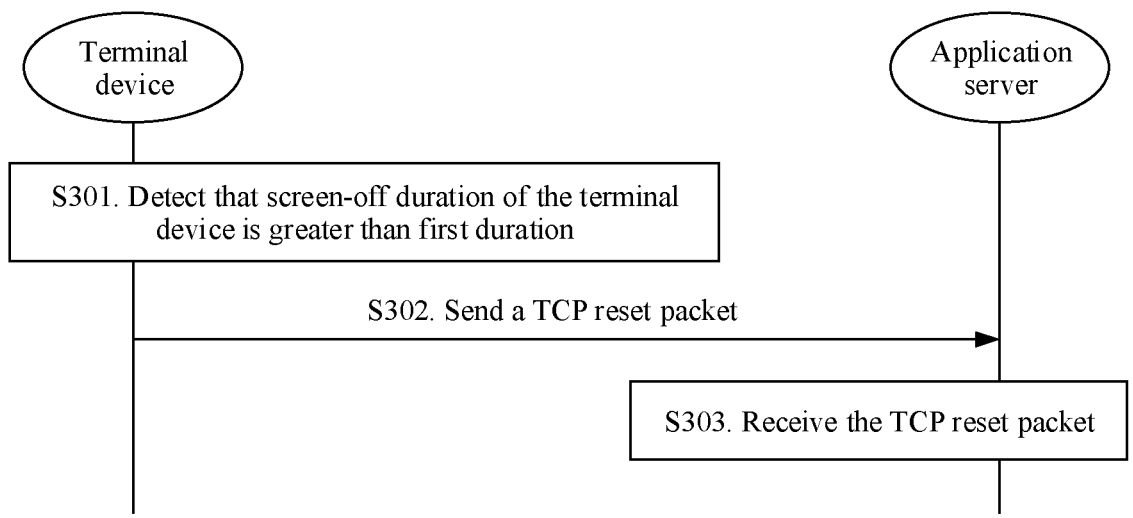
FIG. 3 is a flowchart of a method for reducing power consumption according to an embodiment of this application.

FIG. 3 is a flowchart of a method for reducing power consumption according to an embodiment of this application. As shown in FIG. 3, the method may include the following steps.

S301. A terminal device detects that screen-off duration of the terminal device is greater than first duration.

When the terminal device is not connected to a power supply, and a user turns off a screen of the terminal device, the screen of the terminal device is turned off and is in a screen-off state. In this case, the terminal device detects the terminal device. When detecting that the screen-off duration of the terminal device is greater than the first duration, the terminal device obtains an application that is running in the background. The first duration is less than duration from a moment at which the screen is turned off to a moment at which the terminal device enters an idle state of a doze mode. For example, the first duration may be 10 minutes, and the duration from a moment at which the screen is turned off to a moment at which the terminal device enters the idle state of the doze mode is approximately 64 minutes.

Figure 4:
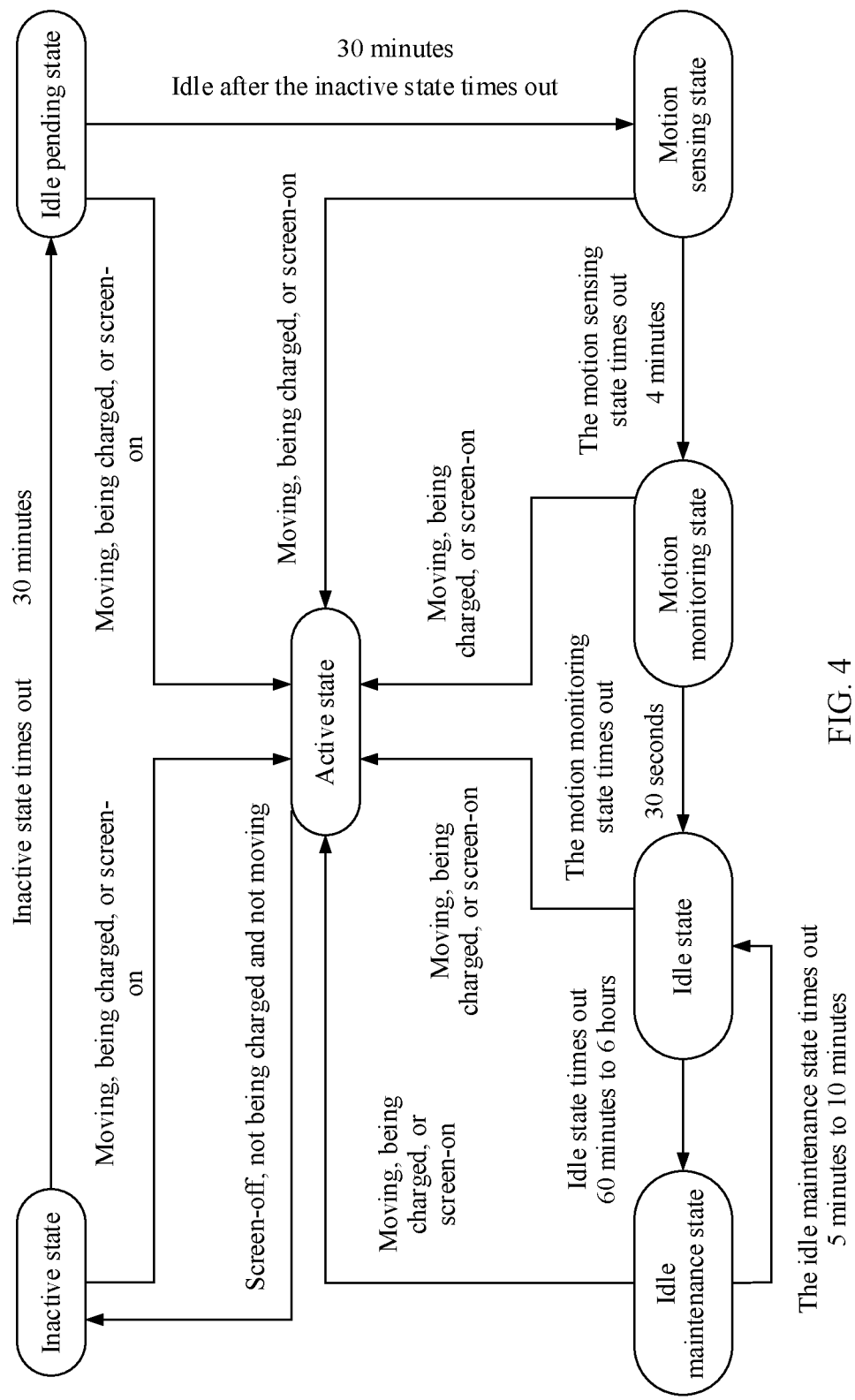
FIG. 4 is a schematic diagram of state switching in a doze mode according to an embodiment of this application.

FIG. 4 is a schematic diagram of state switching in a doze mode according to an embodiment of this application. The doze mode has seven states in total, including an active state (active), an inactive state (inactive), an idle pending state (idle_pending), a motion sensing state (sensing), a motion monitoring state (locating), an idle state (idle), and an idle maintenance state (idle_maintenance). When a user operates the terminal device or the screen of the terminal device is on, the terminal device is in the active state. If the terminal device is not connected to a power supply and the screen is off, the terminal device switches from the active state to the inactive state. After being in the inactive state for 30 minutes, the terminal device switches from the inactive state to the idle pending state. When the terminal device is in the idle pending state, if the terminal device is in a static state and does not move for 30 minutes, the terminal device switches from the idle pending state to the motion sensing state. When the terminal device is in the motion sensing state, if the terminal device is in a static state and does not move for four minutes, the terminal device switches from the motion sensing state to the motion monitoring state. After being in the motion monitoring state for 30 seconds, the terminal device switches from the motion monitoring state to the idle state. Therefore, at least 64 minutes are required for the terminal device from turning off the screen to entering the idle state of the doze mode. After entering the doze mode, the terminal device attempts to restrict an application that is running in the background to accessing a network, to delay working, synchronization, and a standard alarm of the application, and a processor intensive service. After being in the idle state for at least 60 minutes or a maximum of six hours, the terminal device switches from the idle state to the idle maintenance state and processes a suspended application to complete a delayed work activity. In this time period, a system provides a maintenance window application to access the network, to run the waiting activities such as synchronization, working, and alarming. After being in the idle maintenance state for at least five minutes or a maximum of 10 minutes, the terminal device switches from the idle maintenance state to the idle state. As time goes by, the terminal device switches from the idle state to the idle maintenance state at a longer interval. In this way, power consumption is reduced. When the terminal device moves, or the screen is on, or the terminal device is connected to a power supply, the terminal device exits from any one of the inactive state, the idle pending state, the motion sensing state, the motion monitoring state, the idle state, and the idle maintenance state, and enters the active state. All applications resume normal activities.

S302. The terminal device sends a TCP reset packet to an application server of a to-be-controlled application.

Before sending the TCP reset packet to the application server of the to-be-controlled application, the terminal device may receive a TCP acknowledgment packet and the like. The terminal device may obtain an IP address and a port number of the application server from the TCP acknowledgment packet, and generate the TCP reset packet based on the IP address and the port number of the application server.

If the terminal device sends TCP reset packets to application servers of N to-be-controlled applications, where N is a positive integer greater than or equal to 2, different to-be-controlled applications are corresponding to different application servers. The terminal device sends one TCP reset packet to an application server corresponding to each to-be-controlled application. In other words, the terminal device needs to send N TCP reset packets. A difference of the N TCP reset packets is that packet headers of the TCP reset packets include different IP addresses and different port numbers. If two applications are corresponding to a same application server, each application separately sends a TCP reset packet to the same application server. For example, different accounts are used to log in to QQ on a same terminal device. In this case, two QQ applications are enabled on the terminal device, and the two QQ applications are corresponding to a same QQ application server.

In addition, after the terminal device sends the TCP reset packet to the application server of the to-be-controlled application, the to-be-controlled application is controlled (suspended). To be specific, after entering the doze mode, the terminal device attempts to restrict the to-be-controlled application to accessing the network, to delay the working, the synchronization, and the standard alarm of the application, and the processor intensive service.

S303. The application server receives the TCP reset packet sent by the terminal device.

After receiving the TCP reset packet sent by the terminal device, the application server disconnects a TCP connection to the terminal device, so that the application server no longer sends a TCP retransmission packet to the terminal device.

Figure 5:
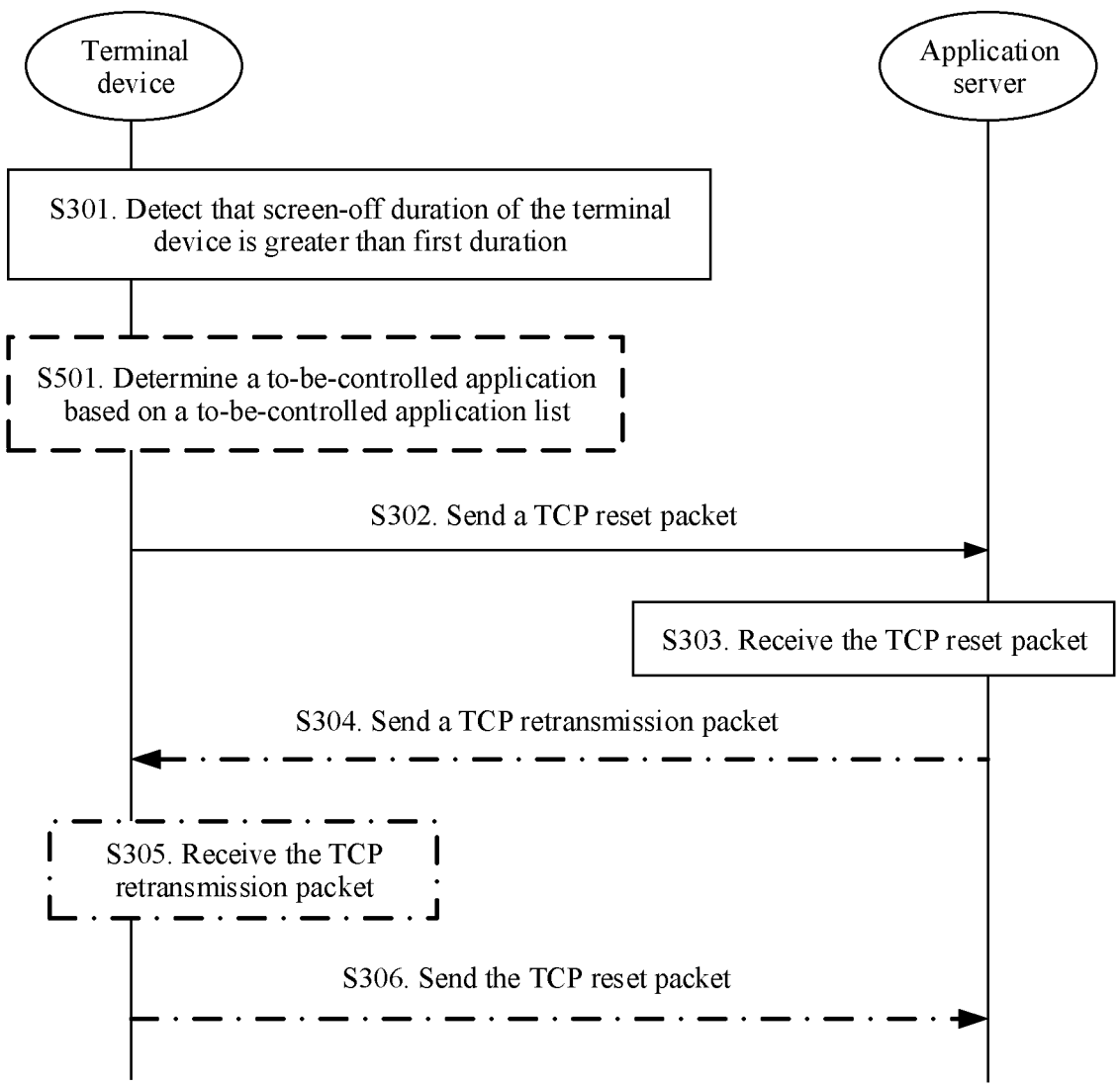
FIG. 5 is a flowchart of another method for reducing power consumption according to an embodiment of this application.

Further, after detecting that the screen-off duration of the terminal device is greater than the first duration, the terminal device may first determine the to-be-controlled application, and then send the TCP reset packet to the application server of the to-be-controlled application. In a possible implementation, the terminal device may preset a to-be-controlled application list, for example, a blacklist, and determine the to-be-controlled application based on the blacklist after detecting that the screen-off duration of the terminal device is greater than the first duration. As shown in FIG. 5, after the terminal device detects that the screen-off duration of the terminal device is greater than the first duration, this embodiment of this application further includes the following detailed steps.

S501. The terminal device determines the to-be-controlled application based on the to-be-controlled application list.

Before turning off the screen, the user may not disable an application running in the background. When detecting that the screen-off duration of the terminal device is greater than the first duration, the terminal device obtains the application running in the background, and determines whether the application running in the background is an application in the to-be-controlled application list. If the application running in the background is an application in the to-be-controlled application list, the terminal device determines the application running in the background as a to-be-controlled application, and sends a transmission control protocol reset packet to an application server of the to-be-controlled application, so that the application server disconnects a TCP connection to the terminal device and the to-be-controlled application is controlled. If the application running in the background is not an application in the to-be-controlled application list, the application running in the background is not processed. The to-be-controlled application list includes at least one to-be-controlled application.

In the prior art, in the doze mode, the terminal device controls an application by using a whitelist. An application in the whitelist is usually an Android system program. In other words, an application other than the Android system program is controlled by the terminal device in the doze mode. In this way, control granularity is excessively coarse. If a third-party application (for example, We Chat or Weibo) frequently used by the user is controlled, a TCP retransmission packet sent by a corresponding application server is easily received. Consequently, the terminal device easily exits the doze mode and is frequently woken up, and power consumption of the terminal device is increased. However, the terminal device usually needs to be continuously screen-off for one hour in the static state before entering the doze mode. Therefore, user experience and power consumption are not easily balanced.

Figure 6:
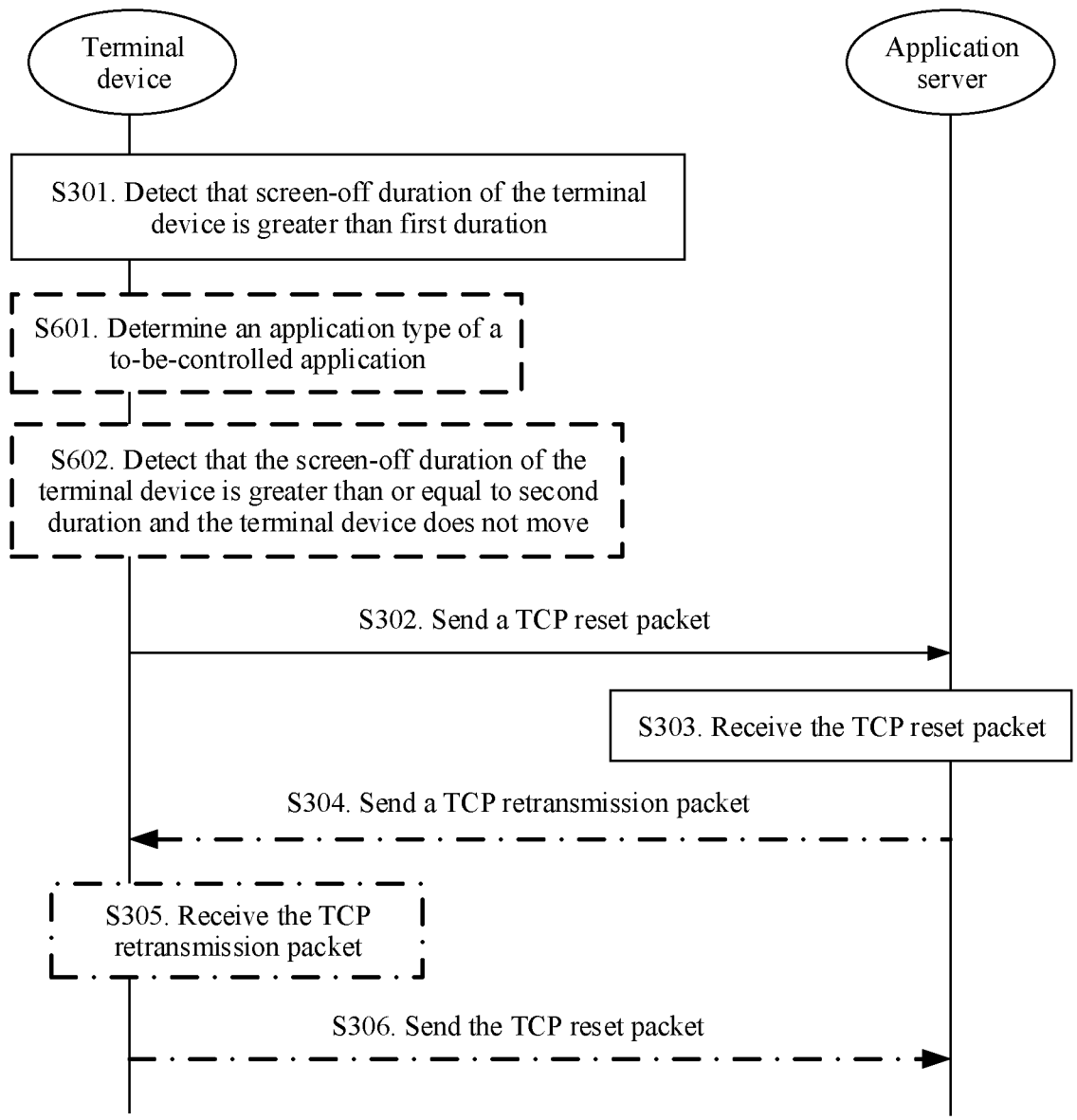
FIG. 6 is a flowchart of still another method for reducing power consumption according to an embodiment of this application.

According to the method for reducing power consumption provided in this embodiment of this application, the to-be-controlled application may be classified based on an application type of the to-be-controlled application, and then the TCP reset packet is sent to the application server of the to-be-controlled application based on the application type of the to-be-controlled application, to implement refined control over the to-be-controlled application, thereby reducing power consumption. As shown in FIG. 6, this embodiment of this application further includes the following detailed steps.

Before the TCP reset packet is sent to the application server of the to-be-controlled application, S601 is performed, or S601 and S602 are performed.

S601. The terminal device determines an application type of the to-be-controlled application.

The terminal device may determine an application type of the to-be-controlled application by analyzing attributes such as a program component and a capability of the to-be-controlled application, and a user behavior. For example, an instant messaging application (WeChat or QQ) includes a voice component, a photographing component, and the like. A traveling application (DiDi or Uber) includes a map component and the like. Alternatively, the terminal device may classify an application, based on a user's use habit, as an application whose use interval is greater than preset duration or an application whose use interval is less than or equal to the preset duration. A use interval of an application indicates an interval at which the user uses the application twice. An application whose use interval is greater than the preset duration may be understood as an application that is not used by the user for a long time. An application whose use interval is less than or equal to the preset duration may be understood as an application frequently used by the user. Certainly, an application may also be classified, based on power consumption, as a type of power-intensive application or a type of local application that does not need to access a network, for example, an e-book or a game.

Figure 7:
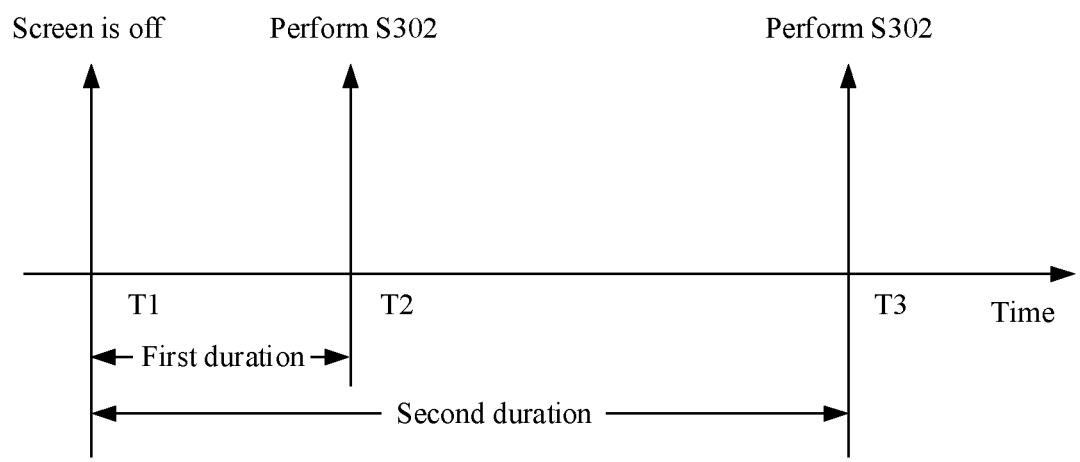
FIG. 7 is a schematic diagram of a method for reducing power consumption according to an embodiment of this application.

FIG. 7 is a schematic diagram of a method for reducing power consumption according to an embodiment of this application. At a moment T1, the screen of the terminal device is turned off, and at a moment T2, it is detected that the screen-off duration of the terminal device is greater than the first duration (for example, duration from T1 to T2), and the application type of the to-be-controlled application is determined. If the application type of the to-be-controlled application is a type such as the application whose use interval is greater than preset duration, the power-intensive application, or the local application that does not need to access a network, the terminal device may directly send the transmission control protocol reset packet to the application server of the to-be-controlled application based on the application type of the to-be-controlled application, that is, S302 is performed. If the application type of the to-be-controlled application is a type of application whose use interval is less than or equal to the preset duration, the terminal device may continue to monitor the screen-off duration of the terminal device, that is, S602 is first performed. Then the terminal device sends the transmission control protocol reset packet to the application server of the to-be-controlled application based on the application type of the to-be-controlled application, that is, S302 is performed.

S602. The terminal device detects that the screen-off duration of the terminal device is greater than or equal to second duration and the terminal device does not move.

The second duration (for example, duration from T2 to T3) is greater than the first duration, and the second duration is equal to the duration from the moment at which the screen is off to the moment at which the terminal device enters the idle state of the doze mode.

Figure 8:
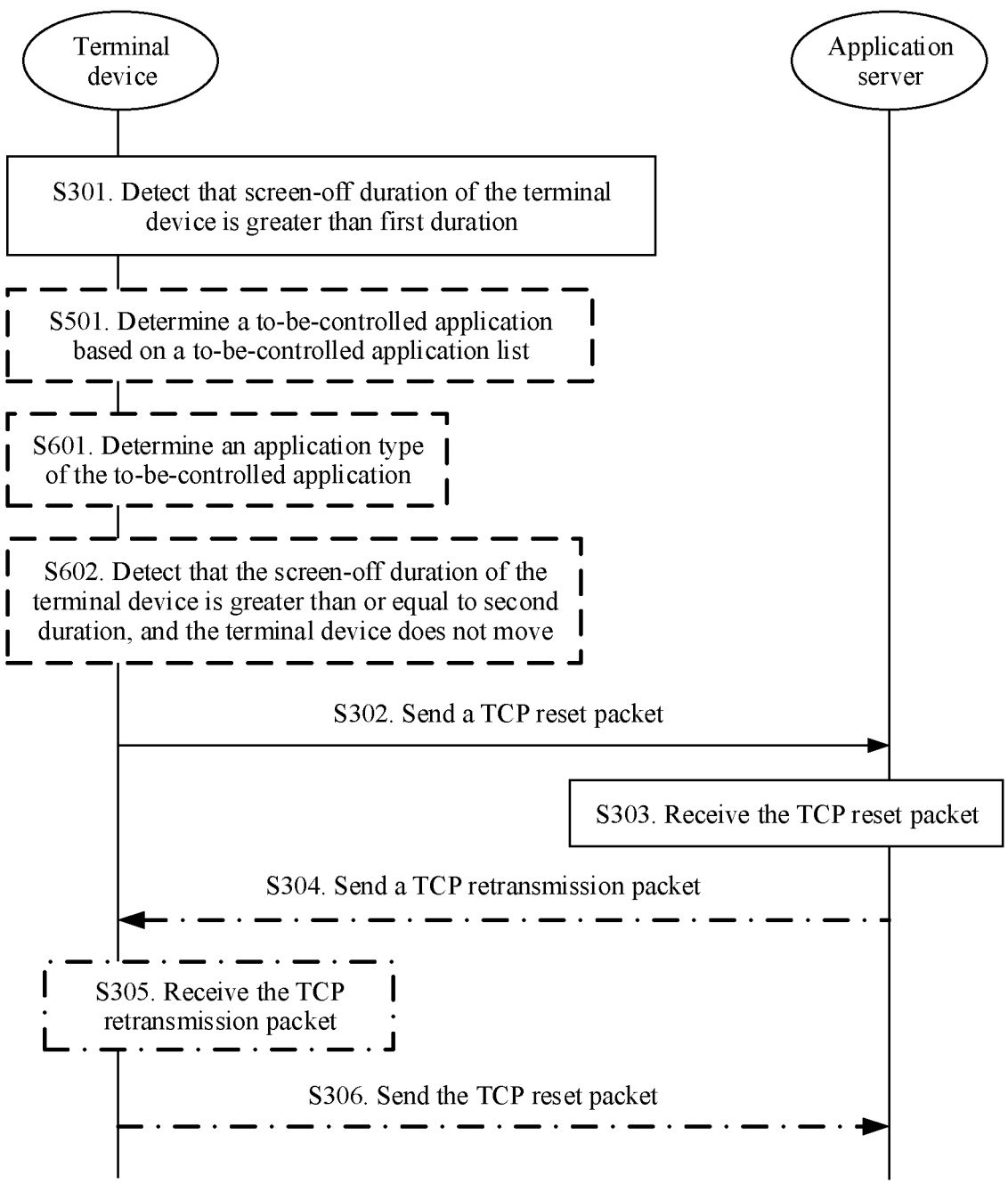
FIG. 8 is a flowchart of yet another method for reducing power consumption according to an embodiment of this application.

As shown in FIG. 8, in a possible implementation, after detecting that the screen-off duration of the terminal device is greater than the first duration, the terminal device may first determine the to-be-controlled application based on the to-be-controlled application list, then determine the application type of the to-be-controlled application, and send the transmission control protocol reset packet to the application server of the to-be-controlled application based on the application type of the to-be-controlled application.

Optionally, before turning off the screen, the user may not disable an application running in the background. After detecting that the screen-off duration of the terminal device is greater than the first duration, the terminal device obtains applications running in the background, and may determine that all the applications running in the background are to-be-controlled applications. The terminal device does not need to determine the to-be-controlled applications based on the to-be-controlled application list and application types of the to-be-controlled applications, and directly sends TCP reset packets to application servers of the to-be-controlled applications, so that the application servers disconnect TCP connections to the terminal device.

In addition, in a process of transmitting the TCP reset packet by the terminal device to the application server, the TCP reset packet may be lost due to a network fault or the like. If the application server does not receive the TCP reset packet, the application server may send a TCP retransmission packet to the terminal device. After sending the TCP reset packet to the application server, the terminal device may enable a TCP retransmission packet monitoring module to monitor the TCP retransmission packet. The TCP retransmission packet monitoring module may be preconfigured in a firewall of the terminal device. As shown in FIG. 5, FIG. 6, and FIG. 8, this embodiment of this application further includes the following detailed steps.

S304. The application server sends a TCP retransmission packet to the terminal device.

S305. The terminal device receives the TCP retransmission packet sent by the application server.

The transmission control protocol retransmission packet is used to instruct the terminal device to retransmit a transmission control protocol acknowledgment packet to the application server.

S306. The terminal device sends the TCP reset packet to the application server.

Figure 9:
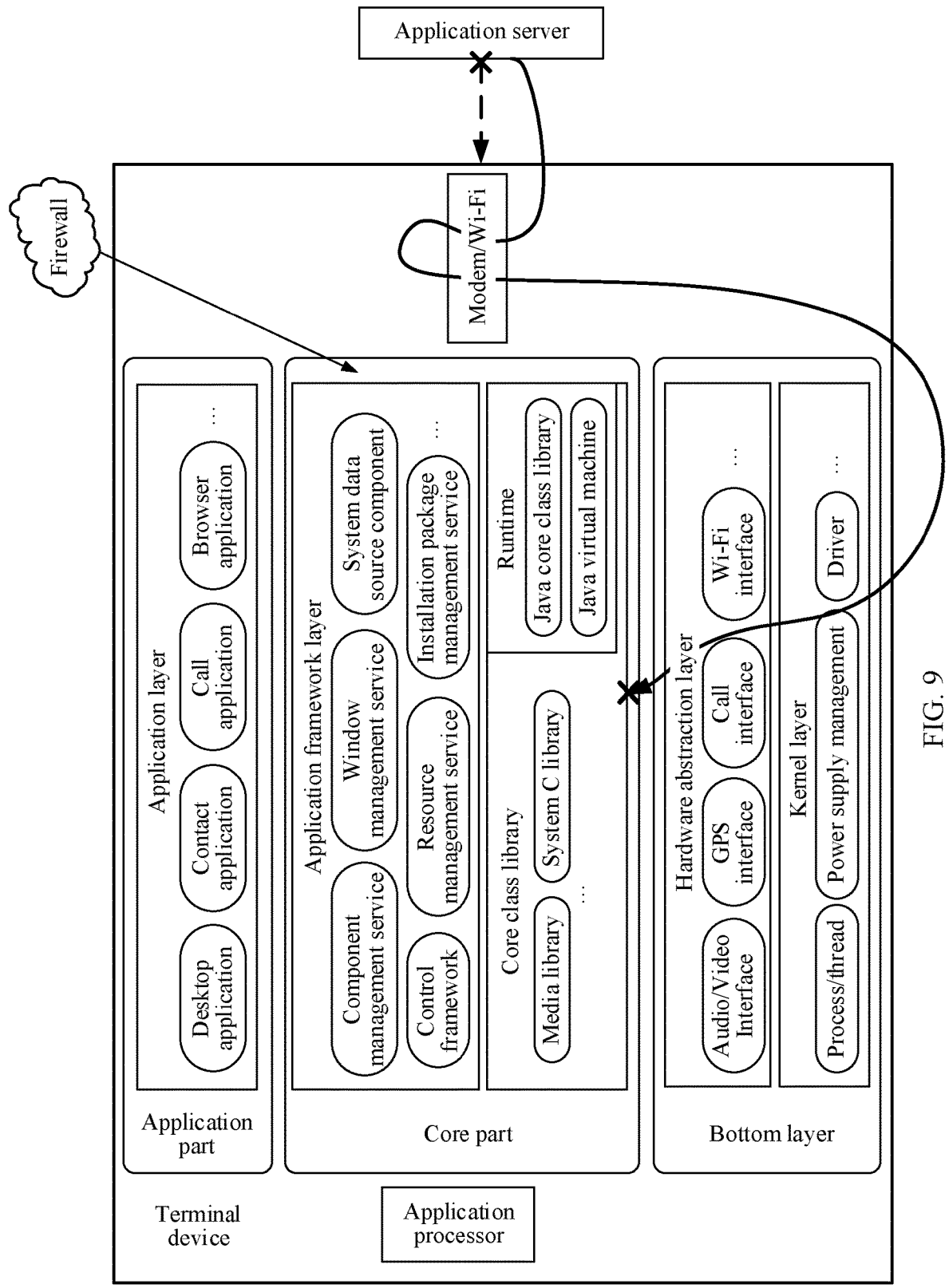
FIG. 9 is a schematic diagram of an architecture of an Android system according to an embodiment of this application.

With reference to an Android system architecture of a terminal device, the following schematically describes a method for reducing power consumption. As shown in FIG. 9, the Android system architecture of the terminal device is divided into an application layer (applications), an application framework layer (applications framework), a system running layer, and a kernel layer from a top layer to a bottom layer.

The application layer is a user-oriented application part in the Android system, and includes all applications running on the terminal device in the Android system. The application layer not only includes system applications (pre-installed on the terminal device together with the Android system), such as a desktop application (home), a contact application (contacts), a call application (phone), a browser application (browser), an SMS message application, a calendar, and a browser, but also includes other third-party applications subsequently installed on the terminal device, such as an instant messaging application (for example, WeChat) or a shopping application (for example, Taobao or Jingdong). All applications are written in JAVA.

The application framework layer is a core part of the Android system, and includes a plurality of system services (system service). The application framework layer includes a component management service (activity manager), a window management service (window manager), a system data source component (content providers), a control framework (view system), a resource management service (resource manager), an installation package management service (package manager), and the like. All services are registered in a system core process (system core process). During running, each service occupies an independent thread, and sends a message and transmits data to each other by using an inter-process communication (inter-process communication, IPC) mechanism.

The system running layer includes runtime and a Java core class library. The runtime includes the Java core class library and a Java virtual machine, to implement secondary compilation of a Java program at a running stage.

A core part of the Android system includes the application framework layer and the system running layer, implementing a core function in the Android system. A developer of each Android application develops an application at the application framework layer and the system running layer.

The bottom layer of the Android system mainly refers to a Linux operating system in which Android registers and a related driver. The bottom layer of the Android system includes the kernel layer and a hardware abstraction layer (hardware abstract layer, HAL). The hardware abstraction layer is a set of interface standards defined by Android for a vendor, and provides interface support for the application framework layer. The vendor needs to implement a corresponding function based on a defined interface, for example, an audio/video interface, a GPS interface, a call interface, or a Wi-Fi interface. The kernel layer includes a process/thread, power management, a driver, and the like.

Before entering the doze mode, the terminal device received a TCP packet sent by an application server. When the application server waits for a TCP acknowledgment packet fed back by the terminal device, the terminal device enters the doze mode. In this case, the terminal device controls a to-be-controlled application and blocks a connection of the application to the application server by using a firewall mechanism. Consequently, the terminal device cannot send the TCP acknowledgment packet to the application server. As shown in FIG. 9, a solid line indicates that the application server does not receive, in a preset time period, the TCP acknowledgment packet fed back by the terminal device, and the application server sends a TCP retransmission packet to the terminal device. The TCP retransmission packet may be parsed at the bottom layer. However, because the terminal device enters the doze mode and controls the application, the TCP retransmission packet cannot be parsed at the core part, and the TCP retransmission packet is discarded at the core part. In this case, the application server cannot receive the TCP acknowledgment packet, and the TCP retransmission packet is continuously sent to the terminal device, causing a vicious cycle. Consequently, a modem and an application processor of the terminal device are frequently woken up, thereby increasing power consumption of the terminal device. A dashed line indicates that after detecting that screen-off duration of the terminal device is greater than first duration, the terminal device obtains a to-be-controlled application, sends a TCP reset packet to an application server of the to-be-controlled application, and controls the to-be-controlled application. After the terminal device enters the doze mode, the application server does not send the TCP retransmission packet to the terminal device.

According to the method for reducing power consumption provided in the embodiments of this application, after determining that the screen is off for a period of time, the terminal device actively sends the TCP reset packet to the application server, so that the application server disconnects the TCP connection to the terminal device. In this way, after the terminal device enters the doze mode, a quantity of times that the terminal device is woken up because the application server constantly sends TCP retransmission packets to the terminal device is reduced, thereby reducing power consumption of the terminal device.

The solutions provided in the embodiments of this application are mainly described from a perspective of interaction between network elements. It may be understood that, to implement the foregoing functions, each network element, such as the terminal device, includes a corresponding hardware structure and/or software module that is used to perform each function. A person of ordinary skill in the art should easily be aware that, in combination with algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the terminal device based on the foregoing method embodiment. For example, each function module may be divided based on each function, or two or more functions may be integrated in one processing module. The integrated module may be implemented in a form of hardware, or may be implemented in a form of a software function module. It should be noted that, in the embodiments of this application, module division is an example, and is merely a logical function division. In actual implementation, another division manner may be used.

Figure 10:
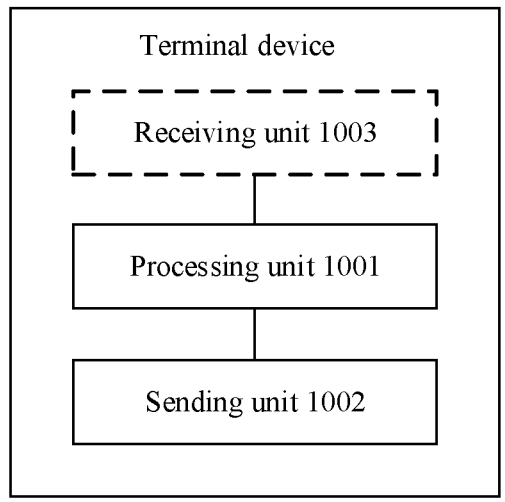
FIG. 10 is a schematic composition diagram of a terminal device according to an embodiment of this application.

When each function module is obtained through division for each function, FIG. 10 is a possible schematic composition diagram of a terminal device involved in the foregoing embodiments. As shown in FIG. 10, the terminal device may include a processing unit 1001 and a sending unit 1002.

The processing unit 1001 is configured to support the terminal device in performing S301 in the method shown in FIGS. 3, S301 and S501 in the method shown in FIG. 5, S301, S601, and S602 in the method shown in FIG. 6, and S301, S501, S601, and S602 in the method shown in FIG. 8.

The sending unit 1002 is configured to support the terminal device in performing S302 in the method shown in FIGS. 3, S302 and S306 in the method shown in FIGS. 5, S302 and S306 in the method shown in FIG. 6, and S302 and S306 in the method shown in FIG. 8.

In an embodiment of this application, further, as shown in FIG. 10, the terminal device may further include a receiving unit 103.

The receiving unit 1003 is configured to support the terminal device in performing S305 in the method shown in FIG. 5, S305 in the method shown in FIG. 6, and S305 in the method shown in FIG. 8.

It should be noted that, for all related content of the steps in the foregoing method embodiments, refer to function descriptions of the corresponding function modules. Details are not described herein again.

The terminal device provided in the embodiment of this application is configured to execute the method for reducing power consumption. Therefore, an effect same as the effect of the method for reducing power consumption may be achieved.

Figure 11:
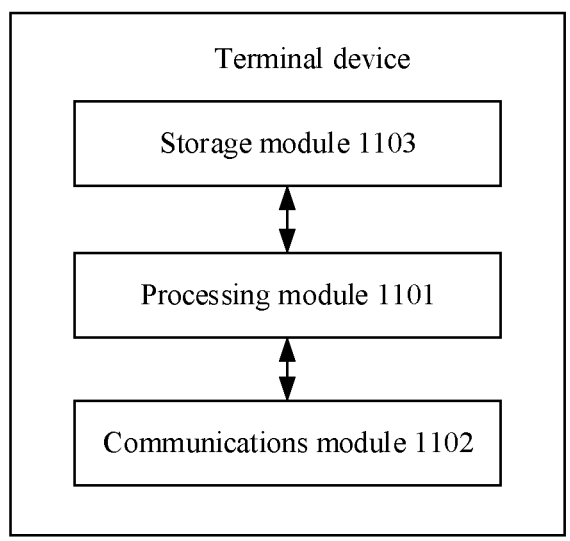
FIG. 11 is a schematic composition diagram of another terminal device according to an embodiment of this application.

When an integrated unit is used, FIG. 11 is another possible schematic composition diagram of the terminal device in the foregoing embodiments. As shown in FIG. 11, the terminal device includes a processing module 1101 and a communications module 1102.

The processing module 1101 is configured to control and manage an action of the terminal device. For example, the processing module 1101 is configured to support the terminal device in performing S301 in the method shown in FIGS. 3, S301 and S501 in the method shown in FIG. 5, S301, S601, and S602 in the method shown in FIG. 6, S301, S501, S601, and S602 in the method shown in FIG. 8, and/or another process used for the technology described in this specification. The processing module 1101 is equivalent to the processing unit 1001, and implements a function of the processing unit 1001. The communications module 1102 is configured to support the terminal device in communicating with another network entity, for example, communicating with a function module or a network entity shown in FIG. 1. Specifically, for example, the communications module 1102 is configured to support the terminal device in performing S302 in the method shown in FIG. 3, S302, S305, and S306 in the method shown in FIG. 5, S302, S305, and S306 in the method shown in FIG. 6, and S302, S305, and S306 in the method shown in FIG. 8. The communications module 1102 is equivalent to the sending unit 1002 and the receiving unit 1003, and completes functions of the sending unit 1002 and the receiving unit 1003. The terminal device may further include a storage module 1103, configured to store program code and data of the terminal device.

The processing module 1101 may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor, and or the like. The communications module 1102 may be a transceiver, a transceiver circuit, a communications interface, or the like. The storage module 1103 may be a memory.

When the processing module 1101 is a processor, the communications module 1102 is a communications interface, and the storage module 1103 is a memory, the terminal device in the embodiment of this application may be the mobile phone shown in FIG. 2.

With descriptions of the foregoing implementations, a person skilled in the art may clearly understand that, for the purpose of convenient and brief description, division of the foregoing function modules is taken as an example for illustration. In actual application, the foregoing functions may be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in another manner. For example, the described apparatus embodiments are merely examples. For example, division into modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on an actual requirement to achieve an objective of a solution of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in a form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a terminal device that is not coupled to a power supply, comprising:
    detecting that a screen-off duration of the terminal device is greater than a first duration, wherein the first duration is less than a second duration that is from a first moment at which the terminal device is in a screen-off mode to a second moment at which the terminal device enters an idle state of a doze mode; and
    sending, in response to detecting that the screen-off duration is greater than the first duration, a Transmission Control Protocol (TCP) reset packet to an application server of a to-be-controlled application, wherein the TCP reset packet instructs the application server to disconnect a TCP connection to the terminal device.

2. The method of claim 1, wherein after detecting that the screen-off duration is greater than the first duration, the method further comprises determining the to-be-controlled application based on a to-be-controlled application list, and wherein the to-be-controlled application list comprises the to-be-controlled application.

3. The method of claim 1, further comprising determining an application type of the to-be-controlled application.

4. The method of claim 3, further comprising further sending, based on the application type, the TCP reset packet to the application server.

5. The method of claim 4, wherein before sending the TCP reset packet to the application server, the method further comprises detecting that the screen-off duration is greater than or equal to a third duration and that the terminal device is not moving, wherein the third duration is greater than the first duration, and wherein the third duration is equal to the second duration.

6. The method of claim 1, wherein after sending the TCP reset packet, the method further comprises:
    receiving a TCP retransmission packet from the application server and instructing the terminal device to retransmit a TCP acknowledgment packet to the application server; and
    resending the TCP reset packet to the application server.

7. The method of claim 1, wherein before sending the TCP reset packet to the application server, the method further comprising:
    receiving a TCP acknowledgment packet from the application server;
    obtaining an Internet Protocol (IP) address and a port number of the application server from the TCP acknowledgment packet; and
    generating the TCP reset packet based on the IP address and the port number of the application server.

8. A terminal device comprising:
    a memory configured to store programming instructions; and
    a processor coupled to the memory, wherein the programming instructions, when executed by the processor, cause the terminal device to:
        detect that a screen-off duration of the terminal device is greater than a first duration, wherein the first duration is less than a second duration that is from a first moment at which the terminal device is in a screen-off mode to a second moment at which the terminal device enters an idle state of a doze mode, and wherein the terminal device is not coupled to a power supply; and
        send, in response to detecting that the screen-off duration is greater than the first duration, a Transmission Control Protocol (TCP) reset packet to an application server of a to-be-controlled application, wherein the TCP reset packet instructs the application server to disconnect a TCP connection to the terminal device.

9. The terminal device of claim 8, wherein the programming instructions, when executed by the processor, further cause the terminal device to determine the to-be-controlled application based on a to-be-controlled application list, and wherein the to-be-controlled application list comprises the to-be-controlled application.

10. The terminal device of claim 8, wherein the programming instructions, when executed by the processor, further cause the terminal device to determine an application type of the to-be-controlled application.

11. The terminal device of claim 10, wherein the programming instructions, when executed by the processor, further cause the terminal device to send, based on the application type, the TCP reset packet to the application server.

12. The terminal device of claim 11, wherein the programming instructions, when executed by the processor, further cause the terminal device to detect that the screen-off duration of the terminal device is greater than or equal to a third duration and the terminal device does not move, wherein the third duration is greater than the first duration, and wherein the third duration is equal to the second duration.

13. The terminal device of claim 8, wherein the programming instructions, when executed by the processor, further cause the terminal device to:
    receive a TCP retransmission packet from the application server, wherein the TCP retransmission packet instructs the terminal device to retransmit a TCP acknowledgment packet to the application server; and
    resend the TCP reset packet to the application server.

14. The terminal device of claim 8, wherein before sending the TCP reset packet to the application server, the programming instructions, when executed by the processor, further cause the terminal device to:
    receive a TCP acknowledgment packet from the application server;
    obtain an Internet Protocol (IP) address and a port number of the application server from the TCP acknowledgment packet; and
    generate the TCP reset packet based on the IP address and the port number of the application server.

15. A computer program product comprising computer-executable instructions stored on a non-transitory computer readable medium that, when executed by a processor of a terminal device, cause the terminal device to:
    detect that a screen-off duration of the terminal device is greater than a first duration, wherein the first duration is less than a second duration that is from a first moment at which the terminal device is in a screen-off mode to a second moment at which the terminal device enters an idle state of a doze mode, and wherein the terminal device is not coupled to a power supply; and sending, in response to detecting that the screen-off duration is greater than the first duration, a Transmission Control Protocol (TCP) reset packet to an application server of a to-be-controlled application, wherein the TCP reset packet instructs the application server to disconnect a TCP connection to the terminal device.

16. The computer program product of claim 15, wherein the computer-executable instructions further cause the terminal device to determine the to-be-controlled application based on a to-be-controlled application list, and wherein the to-be-controlled application list comprises the to-be-controlled application.

17. The computer program product of claim 15, wherein the computer-executable instructions further cause the terminal device to determine an application type of the to-be-controlled application.

18. The computer program product of claim 17, wherein the computer-executable instructions further cause the terminal device to send, based on the application type, the TCP reset packet to the application server.

19. The computer program product of claim 18, wherein the computer-executable instructions further cause the terminal device to detect that the screen-off duration is greater than or equal to a third duration and the terminal device does not move, wherein the third duration is greater than the first duration, and wherein the third duration is equal to the second duration.

20. The computer program product of claim 15, wherein the computer-executable instructions further cause the terminal device to:
  receive a TCP retransmission packet from the application server, wherein the TCP retransmission packet instructs the terminal device to retransmit a TCP acknowledgment packet to the application server; and
  resend the TCP reset packet to the application server.

* * * * *